United States Patent [19]

Kazadi

[11] Patent Number: 5,127,943
[45] Date of Patent: Jul. 7, 1992

[54] TREATMENT OF RECLAMATION BAGHOUSE DUST

[75] Inventor: Joseph B. Kazadi, Florence, Ala.

[73] Assignee: Reynolds Metals Company, Richmond, Va.

[21] Appl. No.: 369,892

[22] Filed: Jun. 22, 1989

[51] Int. Cl.⁵ .............................................. C22B 1/243
[52] U.S. Cl. ............................. 75/773; 423/DIG. 20
[58] Field of Search .............. 75/0.5 R, 3, 25, 65, 75/68 R, 257, 773; 266/157; 405/129; 55/72; 423/DIG. 20

[56] References Cited

U.S. PATENT DOCUMENTS

| | | | |
|---|---|---|---|
| 2,206,117 | 7/1940 | Osborn et al. | 75/25 |
| 2,480,901 | 9/1949 | Bowden et al. | 75/773 |
| 3,107,166 | 10/1963 | Behr | 75/44 |
| 3,169,054 | 2/1965 | Werner | 75/773 |
| 3,790,143 | 2/1974 | Nix | 266/157 |
| 3,864,092 | 2/1975 | Ravitz | 29/186 |
| 3,870,507 | 2/1975 | Allan | 75/4 |
| 4,013,455 | 3/1977 | Kleeberg et al. | 75/68 R |
| 4,105,457 | 8/1978 | Pietsch et al. | 106/78 |
| 4,172,715 | 10/1979 | Altman et al. | 75/330 |
| 4,263,042 | 4/1981 | Altman et al. | 75/330 |
| 4,368,070 | 1/1983 | Fracchia | 75/25 |
| 4,496,267 | 1/1985 | Gnaedinger | 404/82 |
| 4,605,435 | 8/1986 | Duyvesteyn | 75/0.5 R |
| 4,814,005 | 3/1989 | Thompson | 75/3 |
| 4,878,944 | 11/1989 | Rolle et al. | 75/773 |

FOREIGN PATENT DOCUMENTS 1394609  5/1975  United Kingdom ................ 75/3

*Primary Examiner*—Melvyn J. Andrews
*Attorney, Agent, or Firm*—Alan T. McDonald

[57] ABSTRACT

A method for treating reclamation baghouse dust originating from particulate material emitted during melting of aluminum scrap metal. The reclamation baghouse dust typically comprises a mixture of carbonaceous materials and heavy metals. The method comprises collecting the baghouse dust, mixing the collected dust with limestone, and compressing the resulting mixture into blocks using a pressure of at least about 3,000 psi.

6 Claims, No Drawings

TREATMENT OF RECLAMATION BAGHOUSE DUST

FIELD OF THE INVENTION

The present invention relates to a method for the treatment of reclamation baghouse dust originating from particulate material emitted during melting of aluminum scrap metal. More particularly, the present invention relates to a method for treating reclamation baghouse dust which results in a product having a reduced tendency towards spontaneous combustion and having a reduced concentration of leachable heavy metals.

BACKGROUND OF THE INVENTION

Reclamation baghouse dust comprises material originating from particulates emitted during melting of aluminum scrap metal. Generally, the dust material is collected and retained on filter bags employed in dust collector systems. Reclamation baghouse dust generally comprises carbonaceous material containing up to about 50% carbon. Thus, baghouse dust exhibits a tendency to undergo spontaneous combustion. The dust material also contains a significant concentration of heavy metals, the specific amounts and types of heavy metals being dependent on the raw material being processed. In many instances, the concentration of heavy metals contained in the dust material exceeds limits imposed by the Environmental Protection Agency, whereby the dust material is classified as hazardous.

Several method are presently practiced for rendering reclamation baghouse dust nonhazardous. These methods are generally known as stabilization and solidification. According to the stabilization method, the baghouse dust is mixed with an alkaline material such as lime or cement. A chemical reaction occurs in the mixture which limits the solubility of toxic components and/or converts the toxic components to a non-toxic form. According to the solidification method, the baghouse dust is compressed into a block or bricks of high structural integrity. However, each of these methods has a significant disadvantage. For example, in the stabilization method, the resulting product still exhibits a significant tendency to spontaneously combust. In the solidification, heavy metals contained in the compressed product are easily leached therefrom. Accordingly, a need exists for an improved treatment method for reclamation baghouse dust which overcomes the disadvantages of the presently employed methods.

The Duyvesteyn U.S. Pat. No. 4,605,435 disclose a method for converting iron-containing steel plant dust into recyclable agglomerates. The method comprises mixing the dust with water and cement and pelletizing the resulting mixture. The Allen U.S. Pat. No. 3,870,507 discloses an additional method for making briquettes from solid particulate steel mill wastes such as blast furnace flue dust, basic oxygen furnace dust and the like. The wastes are mixed with a hydrocarbonaceous binder and the resulting mixture is formed into briquettes. The Pietsch et al U.S. Pat. No. 4,105,457 discloses a similar method for forming briquettes consisting of agglomerated metallized particles or mineral ore particles and a binder consisting of hydrated lime, sodium silicate and water. The Ravitz U.S. Pat. No. 3,864,092 discloses a method for preparing metal scrap materials in a block formed together with a selected bonding material such as cement. The Behr U.S. Pat. No. 3,107,166 discloses additional methods wherein metal scrap materials are compressed into briquettes and provided with a plastic or other non-metallic coating. The Gnaedinger U.S. Pat. No. 4,496,267 discloses a method for using incinerator ash in a pavement composition wherein the incinerator ash is reacted with lime for several days. Finally, the Osborn et al U.S. Pat. No. 2,206,117 discloses a method for recovering metal values from fume deposits wherein the deposits are compressed at temperatures at which the desired metals for recovery are molten.

However, none of these references disclose a treatment method for reclamation baghouse dust which overcomes the disadvantages noted above and provides a nonhazardous product.

SUMMARY OF THE INVENTION

Accordingly, it is an object of the present invention to provide a method for treating reclamation baghouse dust which or from particulate material emitted during melting scrap metal. It is an additional object of present invention to provide a method for treating reclamation baghouse dust wherein the disadvantages of prior art methods are overcome and a nonhazardous product is provided. It is a related object of the invention to provide a method for treating reclamation baghouse dust wherein the product resulting therefrom exhibits a reduced tendency towards spontaneous combustion. It is a further object of the invention to provide a method for treating reclamation baghouse dust wherein the product resulting therefrom contains a reduced concentration of leachable heavy metals.

These and additional objects are provided by the present invention which relates to a method for treating reclamation baghouse dust originating from particulate material emitted during melting of aluminum scrap metal. The method comprises collecting ,the baghouse dust material, mixing the collected dust material with limestone, and compressing the resulting mixture into blocks using a pressure of at least about 3,000 psi. Because the heat of wetting, which is the energy component which initiates spontaneous combustion, is proportional to the amount of surface area of the dust material, compression of the material into blocks reduces the overall surface area and thus the tendency toward spontaneous combustion is essentially eliminated. Additional because the dust material is mixed with the limestone to, .compression, the solubility of the toxic components in the dust material is limited /or the toxic heavy metal components are converted a non-toxic form whereby the concentration of leachable heavy metals in the resulting blocks is significantly reduced. Thus, the method for treating reclamation baghouse dust according to the present invention a nonhazardous product.

These and additional objects and advantages provided by the method of the present invention will be more fully understood in view of the following detailed description.

DETAILED DESCRIPTION

The present invention comprises a method for treating reclamation baghouse dust which originates from particulate material emitted during melting of aluminum scrap metal. As noted above, reclamation baghouse dust comprises carbonaceous material containing up to about 50% carbon. Additionally, the baghouse dust material typically contains a significant concentration of heavy metals, the specific types and amounts of heavy metals depending on the raw material being processed.

According to the present method, the reclamation baghouse dust is collected and mixed with limestone. The limestone is employed in an amount sufficient to limit the solubility of heavy metals contained in the dust and/or to convert heavy metals contained in the dust to a nontoxic form. In a preferred embodiment, the collected baghouse dust and the limestone are mixed in an approximate ratio of at least 1:2 by weight, i.e., at least 1 part baghouse dust to at least 2 parts limestone, by weight.

The resulting mixture of baghouse dust material and limestone is then compressed into blocks using a pressure of at least about 3,000 psi. The compression step achieves a volume reduction of up to eight times the original volume of the dust material-limestone mixture whereby the resulting volume of the compressed blocks is one-eighth the original volume of the dust-limestone mixture. The resulting blocks exhibit a compressive strength of up to approximately 800 psi. The compressed blocks may be of any suitable size. In one embodiment, the blocks are approximately 3.5"×3.5"×12".

In a preferred embodiment of the invention, the reclamation baghouse dust is collected on filter bags in a conventional dust collector system known in the art. Limestone is then injected into the duct work of the dust collector system The resulting mixture of dust material and limestone may then be collected, for example in a hopper below the baghouse system and transferred, for example via a screw conveyor or the like, to a press for compression into blocks. A suitable compressing apparatus comprises the Terrablock Duplex Machine supplied by Terrablock Worldwide of Orlando, Fla.

The method according to the present invention produces a material which is nonhazardous and exhibits a reduced tendency towards spontaneous combustion. More particularly, the addition of the limestone to the dust material reduces the concentration of leachable heavy metals to 1/100 the original concentration. Moreover, the heat of wetting, which is the energy component that initiates spontaneous combustion, is proportional to the amount of surface area so that compression of the material into the blocks reduces the surface area and therefore substantially eliminates the tendency towards spontaneous combustion.

The preceding description is set forth to illustrate specific embodiments of the invention and is not intended to limit the scope of the method of the present invention. Additional embodiments and advantages within the scope of the claimed invention will be apparent to one of ordinary skill in the art.

What is claimed is:

1. A method for treating reclamation baghouse dust originating from particulate material emitted during melting of aluminum scrap, said baghouse dust comprising a mixture of carbonaceous material and heavy metals, with carbonaceous material comprising up to about 50% of said baghouse dust, said method comprising
   (a) collecting reclamation baghouse dust originating from particulate material emitted during melting of aluminum scrap material;
   (b) mixing the collected baghouse dust with an amount of limestone sufficient to limit the solubility of heavy metals contained in said baghouse dust by converting said heavy metals to a nontoxic form, the resulting mixture consisting essentially of said baghouse dust and said limestone; and
   (c) compressing the resulting mixture into blocks using a pressure of at least about 3,000 psi to thereby reduce the volume of the resulting blocks in an amount sufficient to substantially eliminate the tendency of said baghouse dust to spontaneously combust.

2. A method as defined by claim 1, wherein the collected baghouse dust and the limestone are mixed in a ratio of 1:2, by weight.

3. A method as defined by claim 1, wherein the compression step is continued until the volume of the resulting compressed blocks is one-eighth the original volume of the mixture.

4. A method as defined by claim 1, wherein the baghouse dust is collected on filter bags in a dust collector system.

5. A method as defined by claim 4, wherein the limestone is injected into the dust collector system.

6. A method as defined by claim 5, wherein the resulting mixture is transferred to a compressing apparatus by means of a screw conveyor.

* * * * *